(12) United States Patent
Pauwels et al.

(10) Patent No.: US 11,196,676 B2
(45) Date of Patent: Dec. 7, 2021

(54) ENCAPSULATION OF DATA PACKETS

(71) Applicant: Nokia Solutions and Networks OY, Espoo (FI)

(72) Inventors: Bart Pauwels, Tessenderlo (BE); Yannick Lefevre, Kessel-Lo (BE); Jochen Maes, Antwerp (BE)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 16/594,492

(22) Filed: Oct. 7, 2019

(65) Prior Publication Data
US 2020/0162395 A1 May 21, 2020

(30) Foreign Application Priority Data
Nov. 15, 2018 (EP) .................................... 18206620

(51) Int. Cl.
*H04L 12/823* (2013.01)
*H04L 12/851* (2013.01)
*H04L 12/861* (2013.01)
*H04L 29/06* (2006.01)
*H04L 12/64* (2006.01)
*H04L 12/875* (2013.01)
*H04L 12/863* (2013.01)
*H04W 28/24* (2009.01)

(52) U.S. Cl.
CPC .............. *H04L 47/32* (2013.01); *H04L 47/24* (2013.01); *H04L 49/90* (2013.01); *H04L 69/22* (2013.01)

(58) Field of Classification Search
CPC ......... H04L 47/32; H04L 47/24; H04L 49/90; H04L 69/22; H04L 2012/6478; H04L 47/56; H04L 47/6215; H04L 47/624; H04L 47/54; H04W 28/24
See application file for complete search history.

(56) References Cited

U.S. PATENT DOCUMENTS

| 8,711,705 B1* | 4/2014 | Johnson ............. H04L 41/5009 370/241 |
| 10,838,836 B1* | 11/2020 | Danilin ................. G06F 16/168 |
| 2004/0100941 A1* | 5/2004 | Lim ..................... H04B 7/1858 370/349 |
| 2009/0325512 A1* | 12/2009 | Granlund ................ H04L 47/56 455/91 |

(Continued)

FOREIGN PATENT DOCUMENTS

EP 2942891 A1 11/2015

OTHER PUBLICATIONS

European Office Action dated Mar. 17, 2021 issued in corresponding European Appln. No. 18206620.9.

*Primary Examiner* — Harry H Kim
(74) *Attorney, Agent, or Firm* — Harness, Dickey & Pierce, P.L.C.

(57) ABSTRACT

Example embodiments describe a transmitter including data encapsulation circuitry configured to encapsulate data packets into Data Transport Units, DTUs, for further transmission over a communication medium. The data packets have respective Quality of Service, QoS, tolerances. The data encapsulation circuitry is configured to delay transmission of first data packets with a lower QoS tolerance and to group the first data packets in a subset of DTUs available for transportation of the first data packets.

14 Claims, 3 Drawing Sheets

(56) References Cited

U.S. PATENT DOCUMENTS

| | | | |
|---|---|---|---|
| 2010/0138714 A1 | 6/2010 | Sorbara et al. | |
| 2011/0280195 A1* | 11/2011 | Muppalla | H04L 1/1825 370/329 |
| 2012/0106475 A1* | 5/2012 | Jung | H04L 12/6418 370/329 |
| 2012/0155440 A1* | 6/2012 | Long | H04L 47/32 370/336 |
| 2015/0195216 A1* | 7/2015 | Pietro | H04L 47/365 370/252 |
| 2017/0155590 A1* | 6/2017 | Dillon | H04L 41/5025 |
| 2017/0264560 A1* | 9/2017 | Heine | H04L 12/427 |
| 2019/0215107 A1* | 7/2019 | Lida | H04L 1/1628 |

* cited by examiner

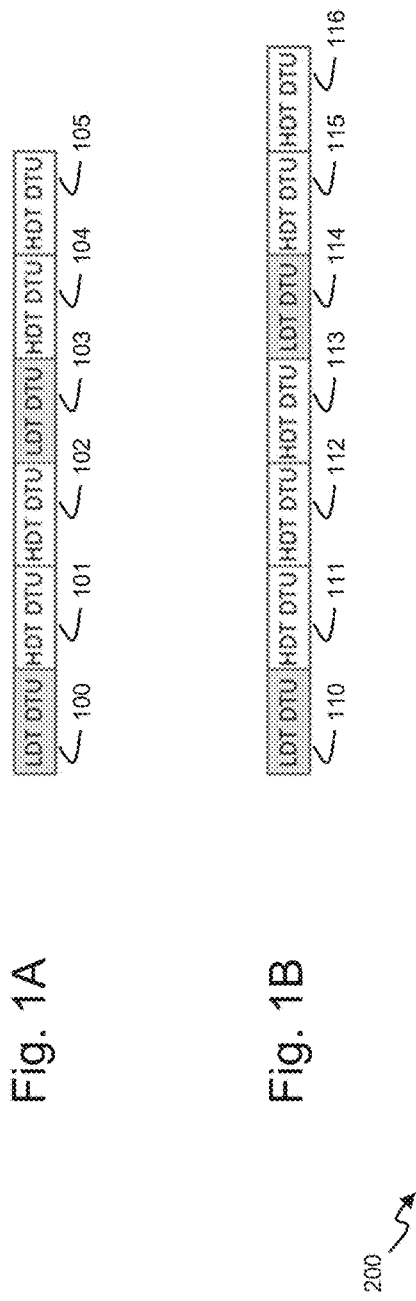
Fig. 1A
Fig. 1B
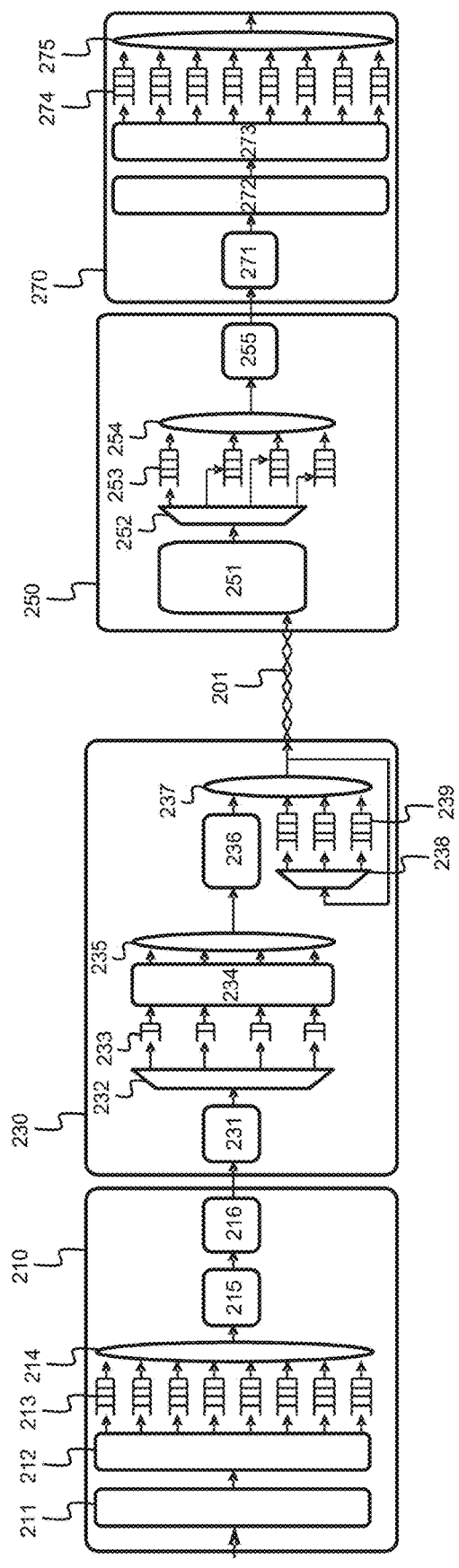
Fig. 2

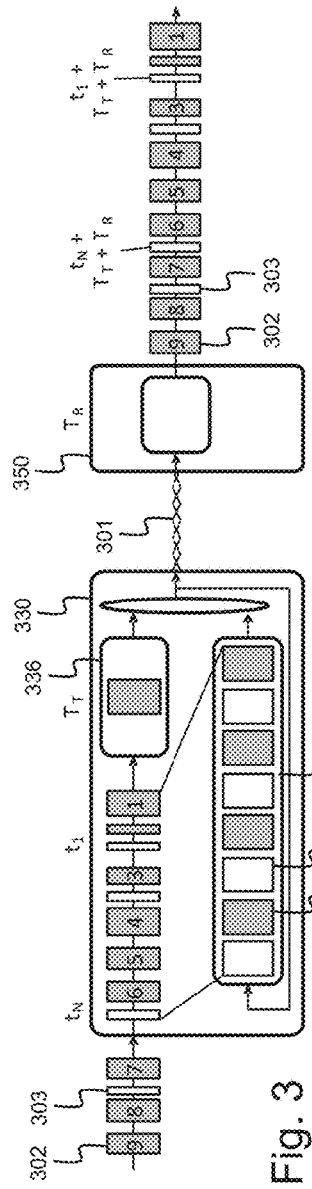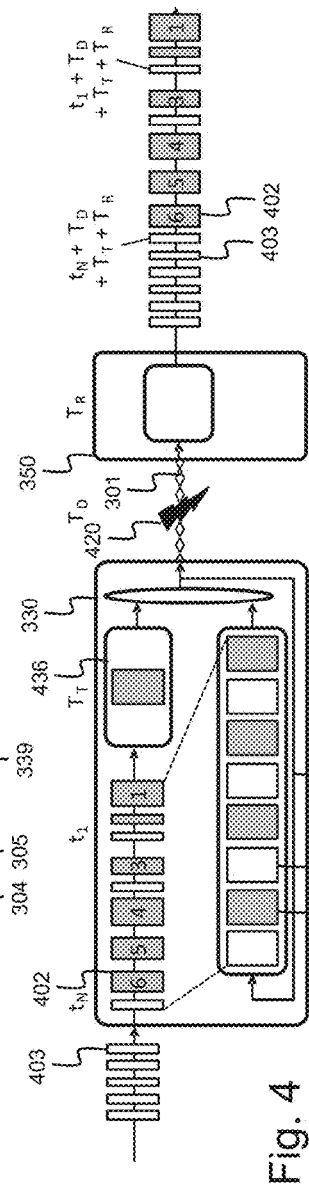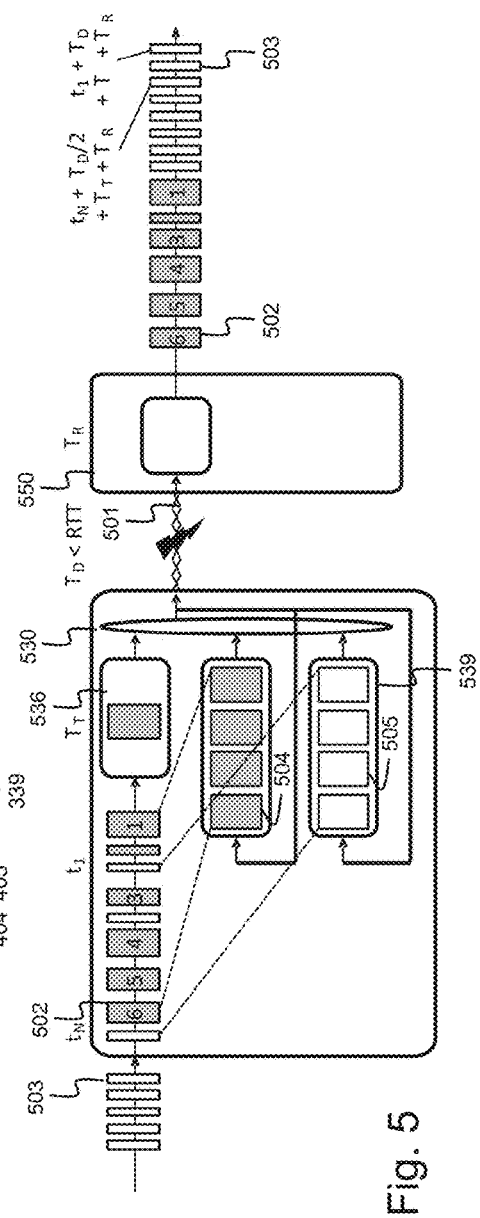

ENCAPSULATION OF DATA PACKETS

CROSS-REFERENCE TO RELATED APPLICATIONS

This application claims priority to European Application 18206620.9, filed Nov. 15, 2018, the entire contents of which are hereby incorporated by reference.

TECHNICAL FIELD

Various example embodiments relate, amongst others, to a transmitter, a subscriber device, an access node and related method for encapsulation of data packets into Data Transport Units, DTUs.

BACKGROUND

At a transmitter, one or more data packets are encapsulated into a larger data container structure or into a DTU and transmitted over a communication medium as a single unit of data. A data packet may have one or more Quality of Service, QoS, related parameters that identify what limitations exist on how characteristics of the communication system may affect the QoS of the communication carried out by the data packet. Such characteristics may for example relate to packet loss, packet errors, latency, out-of-order delivery of the packets and packet delay variations.

Solutions for encapsulation of data packets into DTUs consider these characteristics of the communication medium and support the extra mechanisms required for meeting the QoS needs of data packets with different QoS related parameters.

SUMMARY

A problem with existing QoS differentiating solutions is that they may have an unpredictable efficiency in differentiating transmission behaviour for QoS, and, as a consequence, may negatively affect the bandwidth efficiency of a communication. It is an object of the present disclosure to provide an improved solution.

This object is achieved, according to a first example aspect of the present disclosure, by a transmitter comprising a data encapsulation circuitry for encapsulating data packets into Data Transport Units, DTUs, for further transmission over a communication medium; the data packets having respective Quality of Service, QoS, tolerances. The data encapsulation circuitry is configured to delay transmission over the communication medium of first data packets with a lower QoS tolerance and to group the first data packets in a subset of DTUs available for transportation of the first data packets.

In other words, for a group of N consecutive DTUs that are capable of transporting the first data packets with the lower QoS tolerance, the first packets are concentrated in a strict subset of on average M DTUs out of this group, wherein M and N are positive integers and M is lower than N.

As a result, first data packets or DTUs partially filled with the first data packets are delayed until the next transmission opportunity for a DTU of the subset. In other words, although the first data packets have a lower QoS tolerance than other data packets, they are still delayed with respect to these other data packets. This means that, on average, the first data packets will exhibit an extra delay in comparison with a solution that prioritizes the encapsulation and transmission of the first data packets, or with a solution that does not prioritize data packets according to QoS tolerance for transmission. On the other hand, because the first data packets are concentrated in a subset of the DTUs and not spread out over all DTUs, less DTUs with the first data packets will be transmitted. Typically, DTUs containing data packets with lower QoS tolerances will have to be transmitted with higher priority or be retransmitted more often and faster than other DTUs. Therefore, because less DTUs contain the first data packets and less such DTUs reside in the transmitter in case of a disturbance, communication services will recover more efficiently from any disturbance on the communication medium, i.e. the first data packets will be delivered faster or with higher integrity to the receiver than with a solution that only prioritizes the encapsulation and transmission of the first data packets. Furthermore, as the lower tolerance packets are concentrated in a subset of the DTUs, the transmitter may differentiate between DTUs with a lower QoS tolerance and DTUs with a higher QoS tolerance.

The subset of DTUs to be used for transmission of the first data packets may be implicitly defined as a consequence of the delaying or vice versa the delay may be determined based on the subset of DTUs to be used. For example by dynamically or statically defining a delay to wait from the receipt of a first data packet with the lower QoS tolerance up to the actual transmission of a DTU containing that first data packet (and possibly further data packets with the same or a different QoS), the subset is implicitly defined. The other way around, by dynamically or statically determining the subset of DTUs to be used for transmitting the first data packets, the delay until the next transmission opportunity of the subset is implicitly defined.

The QoS tolerances may for example relate to at least one of a delay tolerance and a loss tolerance. A delay tolerance is indicative for the tolerance of the communication containing the data packet against a certain exhibited delay. The loss relates to the loss of the data packet during the transmission over the communication medium, e.g. by a disturbance on the communication medium. A loss tolerance is then indicative for the tolerance of the communication against compromising the integrity of the transported data, e.g. loss of data blocks, corruption of individual bits or bit sequences in these data blocks and insertion of extra data blocks or portions thereof.

Because the above encapsulation mechanism results in less DTUs with first data packets, less DTUs with first data packets will be lost. Because of this, less pro-active or re-active retransmissions will have to be performed and more bandwidth will be available for such retransmissions. Furthermore, less first data packets will be lost on average. Furthermore, as less DTUs will need to be retransmitted all DTUs will experience less delay on average.

According to example embodiments, the subset and/or the delaying is determined or adjusted based on at least one of:
  scheduling information;
  a traffic load of the first data packets;
  a total traffic load;
  an arrival pattern of the first data packets;
  QoS requirements associated with the lower QoS tolerance of the first data packets;
  information regarding the communication medium; and
  information regarding disturbances over the transmission medium.

According to example embodiments the data encapsulation circuitry further comprises a retransmission buffer for buffering transmitted DTUs; and the data encapsulation circuitry is further configured to prioritize retransmission of the DTUs of the subset.

Retransmission of DTUs is a mechanism to improve the loss ratio of transmitted DTUs on the communication medium. As the concentration of the first data packets in a subset of the DTUs allows a differentiation between subsets of DTUs in terms of QoS tolerance, a prioritization in retransmission of DTUs of said different subsets is possible. By further prioritizing the retransmission of DTUs of the subset, in case the subset of DTUs is differentiated by carrying data packets with a lower delay tolerance, the average delay exhibited by the first data packets will be reduced. Furthermore, as only a subset of the DTUs will need the prioritized retransmission, the delay for the retransmission itself will also be further reduced.

According to example embodiments the data encapsulation circuitry further comprises a retransmission buffer for buffering transmitted DTUs; and the data encapsulation circuitry is further configured to configure a higher number of re-transmission opportunities for the DTUs (504) of the subset.

By giving the DTUs of the subset more retransmission opportunities, the loss ratio of the first data packets will be better than for the other data packets. As less DTUs will reside in the retransmission buffer, more retransmission opportunities can be allocated in the presence of an overall transmission bandwidth upper bound, and while pertaining a low delay. Furthermore, less transmission capacity will be lost by correcting DTU loss caused by disturbances.

According to example embodiments, the data encapsulation circuitry is further configured to multiplex second data packets with a higher QoS tolerance in the subset of DTUs. In other words, it may occur that a DTU of the subset is to be transmitted but is not yet filled completely with first data packets. In such a case, this DTU is further filled with other data packets. The DTUs of the subset are thus not solely reserved for the first data packets, but, when a next transmit opportunity is due, further completed with other data packets with a higher QoS tolerance. This results in a more effective use of the available transmission bandwidth.

According to example embodiments, the data encapsulation circuitry is further configured to, when enough first data packets are available to fill a complete DTU, transmit the complete DTU with the first data packets without further delaying.

In other words, the DTUs of the subset do not need to be sent at regular or predefined transmission opportunities. When enough first data packets are available to fill a complete DTU of the subset, the full DTU is transmitted as soon as possible. This allows further reducing the average delay of the first data packets.

According to example embodiments the communication medium is a wired point-to-point or point-to-multipoint communication medium, e.g. an optical fibre, a cable or twisted pair based communication medium.

The transmission may be a DSL-based transmission. In such a case, the data packets correspond to DSL DTU frames.

Alternatively, the communication medium is a wireless point-to-point or point-to-multipoint communication medium.

According to example embodiments, a subscriber device is disclosed comprising a transmitter according to the first example aspect.

According to example embodiments, an access node is discloses comprising at least one transmitter according to the first example aspect.

According to a second example aspect, a method is disclosed comprising:

encapsulating data packets into Data Transport Units, DTUs, for further transmission over a communication medium; the data packets having respective Quality of Service, QoS, tolerances;

delaying transmission over the communication medium of first data packets with a lower QoS tolerance; and grouping the first data packets in a subset of DTUs available for transportation of the first data packets.

BRIEF DESCRIPTION OF THE DRAWINGS

Some example embodiments will now be described with reference to the accompanying drawings.

FIG. 1A shows an example embodiment of Data Transport Units, DTUs, wherein low delay tolerance, LDT, data packets are concentrated in a subset of the DTUs;

FIG. 1B shows an example embodiment of Data Transport Units, DTUs, wherein low delay tolerance, LDT, data packets are concentrated in a subset of the DTUs;

FIG. 2 shows an example embodiment of a communication system comprising an encapsulation circuitry for encapsulating data packets in DTUs;

FIG. 3 shows the transmission of data packets with lower and higher QoS tolerance;

FIG. 4 shows the transmission of data packets with lower and higher QoS tolerance during a disturbance on the communication medium;

FIG. 5 shows the transmission of data packets with lower and higher QoS tolerance during a disturbance on the communication medium by a transmitter according to example embodiments; and FIGS. 6A and 6B illustrate other examples of concentrating data packets with a lower QoS tolerance in a subset of the DTUs.

DETAILED DESCRIPTION OF EMBODIMENT(S)

Various example embodiments relate, amongst others, to a transmitter, a subscriber device, an access node and related method for encapsulation of data packets into Data Transport Units, DTUs, that supports Quality of Service, QoS, differentiation. A data packet may have one or more Quality of Service, QoS, related parameters that identify what grade of service is expected from the communication system and, as a consequence, how characteristics of the communication system may affect the QoS of the communication carried out by the data packet. Such characteristics may for example relate to packet loss, packet errors, latency, out-of-order delivery of the packets and packet delay variations. QoS differentiating solutions for encapsulation of data packets into DTUs consider these characteristics of the communication medium and how the characteristics influence the QoS differently for data packets with different QoS related parameters.

To this end, data packets and containers containing such data packets may be organized according to QoS tolerances or a combination thereof in certain QoS classes. One example of such QoS class organization is:

1. A low delay tolerance, LDT, and low loss tolerance, LLT, or shortly LDT&LLT;

2. A low delay tolerance, LDT, and high loss tolerance, HLT, or shortly LDT&HLT;
3. A high delay tolerance, HDT, and low loss tolerance, LLT, or shortly HDT&LLT; and
4. A high delay tolerance, HDT, and high loss tolerance, HLT, or shortly HDT&HLT.

"Low" and "High" should be understood as relative qualifications. In principle, a differentiation of more than 2 levels for delay and loss or corruption tolerance or other QoS related characteristic may be defined. Advantageously, in practical implementations, not more than 8 QoS classes are distinguished for data classification and forwarding, and only 2 to 4 QoS classes are distinguished for data transmission on communication media prone to transmission limitations like limited bandwidth, either structural or temporary due to transmission errors.

The G.fast Digital Subscriber Line, DSL, communication standard as currently defined in ITU-T G.9700 and G.9701 does not support QoS differentiation. The DSL transmitter generates a single flow of consecutive DTUs towards the peer DSL receiver. Each DTU contains data packets, e.g. Ethernet packets, of any QoS class in the sequence as generated by the preceding packet processing Inter-Working Function, IWF.

The G.mgfast DSL communication standard project under ITU-T SG15 differs from the G.fast project as it will introduce QoS differentiation by introducing multiple logical QoS paths between the upstream equipment and each of one or more downstream equipments over the communication medium with separate back pressure in both directions for each of the logical QoS paths. The DSL transmitter still generates a single flow of consecutive DTUs towards the receiver. In one possible approach, each DTU may contain multiple data packets, each of any QoS class. Also, each DTU is marked with a tag reflecting the most demanding QoS class of the different data packets QoS classes that it contains. The capability to transport data packets for multiple QoS classes into the same DTU results in a high transmission efficiency because the DTUs have a fixed size for easy time-domain synchronization. Unused capacity would result in a not-work-conserving operation thereby wasting data transport capacity. Insertion of data packets of multiple QoS classes into the same DTU reduces the opportunities to differentiate DTUs according to the most demanding data packet QoS class, e.g. the maximum delay or loss tolerance of the data that they contain. The data packet sequence as generated by the preceding packet processing IWF may be changed as a function of the original QoS class, typically eight, of the number of logical QoS classes supported at the G.mgfast interface, typically two to four, and of the specific measures configured for each QoS class. Such measures may comprise: i) no priority, pre-empting or pre-empted at the transmitter side within a same DTU because pre-empting of HDT packets by LDT packets allows improving the timing of the latter packet types relative to the former packet types; ii) priority for re-transmission of corrupted DTUs carrying LDT packets; iii) priority for the transmission of new DTUs carrying LDT data packets over re-transmission of corrupted DTUs carrying only HDT data packets; iv) addition of forward error correction, FEC, data block interleaving, or a higher number of retransmission opportunities for LLT DTUs; v) pro-active re-transmission of DTUs carrying LDT/LLT data packets; vi) a configurable number of re-active re-transmission opportunities for DTUs carrying HDT&LLT data packets; vii) priority for release of data packets at the receiver end; and viii) release of data packets at the receiver without waiting for re-transmission at all or while waiting for only a restricted number of re-transmission cycles. However, for measures ii) to vi), to have a meaningful effect, it is required that only a fraction of all DTUs exhibit a lower maximum delay tolerance or loss tolerance. For data packet arrival patterns that basically result in insertion of at least one LDT or LLT data packet in each or nearly each DTU, neither measure will result in an improved latency or improved overhead treatment for the concerned packets during or after traffic corruption conditions, or after back-pressure by the peer receiver side.

Wireless and radio-based data communication may also apply QoS differentiation, for example when applying transmission of DTUs that contain data packets for different services, e.g. ethernet data packets. Some wireless or radio systems support QoS differentiation by applying a different DTU type per QoS class to be distinguished, and by also applying an adapted transmission scheduling discipline per DTU type to be transmitted or re-transmitted. Such approach allows prioritizing full DTUs containing LDT or LLT data. A problem is that it requires variable size DTUs, or results in transmission inefficiency for the QoS class traffic with lower delay or loss tolerance, i.e. requiring higher transmission priority, adding extra redundancy (FEC), data block interleaving or a higher number of re-transmission opportunities.

The above solutions apply re-transmission of larger blocks or containers of data, the DTUs, that contain smaller atomic data packets, for example Ethernet data packets or DTU frames, for protecting the overall communication against an unacceptable data loss probability. An undesired side-effect of such data loss protection mechanism is contention which may create non-negligible and sometimes also unacceptable delay or delay variation. This contention may be caused by re-transmission of DTUs that were corrupted during a previous (re-) transmission, while also new data traffic is presented on the bandwidth limited communication medium.

Mitigation of this additional DTU delay and delay variation requires a complementary QoS differentiation at the DTU level, for managing the latency introduced by the loss-avoiding techniques used. One solution is to define different DTU types each containing only data packets within a limited delay or loss tolerance range. DTUs for different ranges may then be prioritized for (re-) transmission. To limit transmission scheduling complexity and transmission overhead, these DTUs preferably have a fixed size. Also, to obtain the required QoS with respect to delay or loss, the share of LDT or LLT data packets may not exceed a fraction of the available communication medium bandwidth. A problem with this dedicated DTU type for low delay or loss tolerance is that it is inefficient, either because the DTUs are too small or are partly empty depending on the actual share of such traffic.

Another solution is to apply a single DTU stream for encapsulating data packets of multiple QoS classes in order of reception, but to tag each DTU with the relevant QoS characteristic of the data packets it contains. A problem is that this only works in a limited range of data rates and arrival patterns for LDT or LLT data packets. As soon as the data rate of individual LDT or LLT packets nears or exceeds the rate of the transmitted DTUs with a quasi-shaped arrival pattern, a further differentiation is no longer possible. All traffic, including the LDT or HLT data packets, will be subject to the full additional delay and data rate loss, caused by the applied data protection measures.

According to an example embodiment, data packets with a particular type or class of QoS requirement are concentrated in a subset of the DTUs that are available for those data packets. The container or DTU may be further completed or multiplexed with data packets of other QoS classes, typically exhibiting a higher load and less stringent QoS needs. This allows providing a deterministic amount of differentiation between the DTUs such that they may be treated according to the most demanding QoS requirements of data packets they carry. The mechanism further guarantees the QoS differentiation irrespective of the different QoS class data packet arrival patterns and load, even when the DTUs are filled in a data rate conserving manner, e.g. with data packets of different QoS classes, thereby avoiding loss of transmission capacity. Data packets that are concentrated in the subset of DTUs and exhibiting more stringent QoS needs than some of the other data packets are further referred to as data packets that have a lower QoS tolerance. For example, packets with a lower QoS tolerance may be classified as being LDT and/or LLT.

FIGS. 1A and 1B illustrate two examples of concentrating data packets with a lower QoS tolerance in a subset 100, 103 and 110, 114 of respective DTUs 100-105 and 110-116. More generally, if the total amount of available DTUs in a certain transmission windows is N, then the lower QoS tolerant DTUs are concentrated in a subset of M DTUs out of the N available DTUs, wherein M is smaller than N. In other words, lower QoS tolerant data packets are concentrated in a limited fraction M/N of the available DTUs that are available for transmission of the lower QoS tolerant data packets. The M DTUs 100, 103 and 110, 114 may further be spaced as far apart as possible from each other. This concentration inevitably involves an additional delaying of the lower QoS tolerant data packets, even in normal traffic condition wherein no further delays are present in the transmission pipeline because these data packets are excluded from encapsulation in a fraction of on average (1−M/N) of the available DTUs and are forced to some extent in the remaining fraction of on average (M/N) of DTUs. The unused capacity in the subset of M DTUs may further be filled up with higher QoS tolerant data packets. By the exclusion an additional average time delay of (1/2)*(N/M)*(DTU duration) is imposed on the lower QoS tolerant data packets. This is typically a few orders of magnitude smaller than the duration of possible transmission disturbance events that may occur on wired and wireless transmission media, e.g. a few milliseconds on a DSL copper pair. The reduction in the re-transmission delay for LLT data packets contained in the subset of the DTUs that were stored for re-transmission after such a disturbance event is, on average (1−M/N)*(duration of the transmission disturbance event), when the re-transmission is only performed for DTUs of the subset.

Figures 6A, 6B:
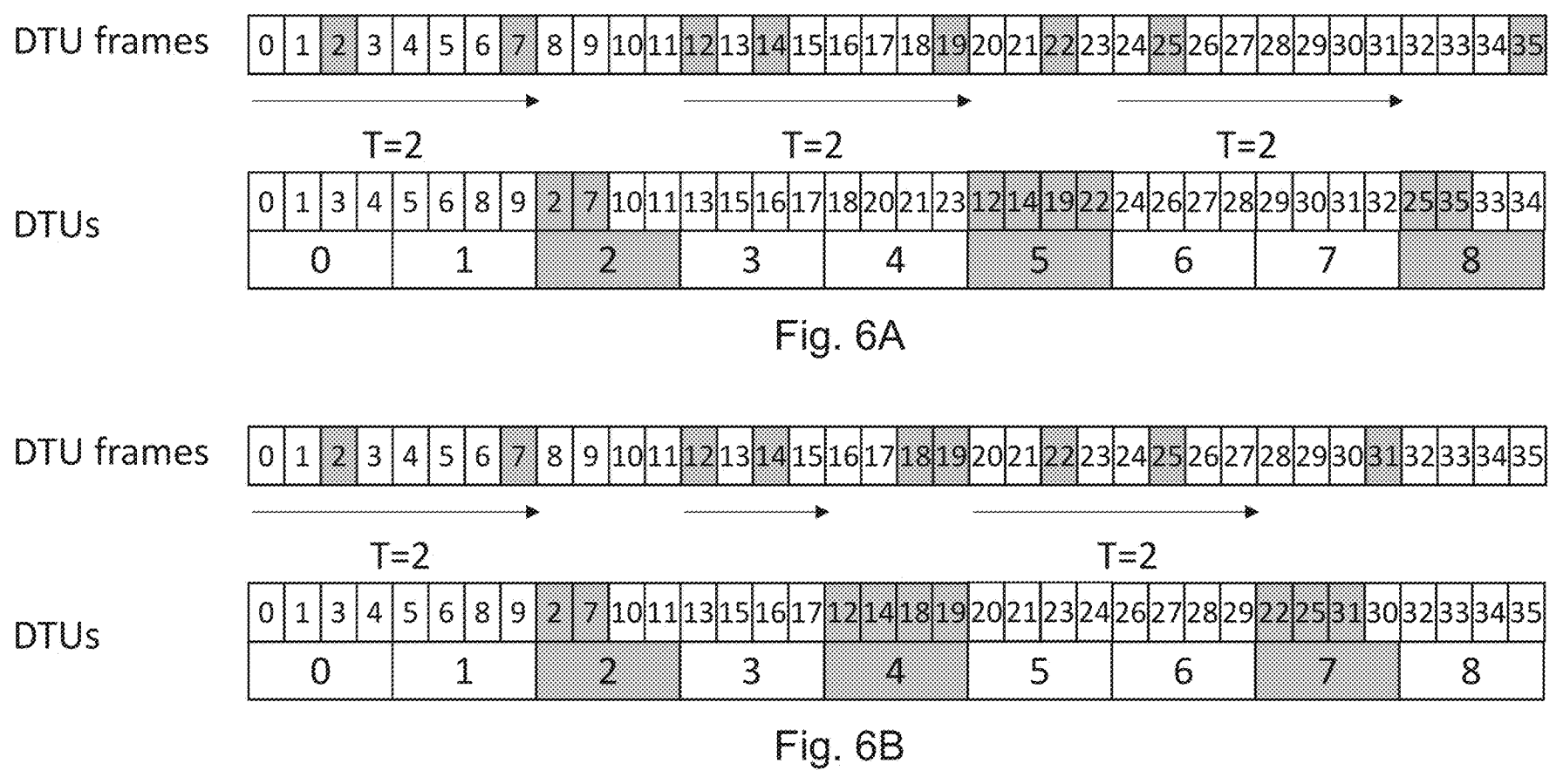

FIGS. 6A and 6B illustrate another example of concentrating data packets with a lower QoS tolerance. There are 4 data packets in each DTU. These data packets are ordered from 0 to 35 according to their arrival order. In total there are 36 data packets, 8 of which are LDT data packets (indicated in grey; data packet numbers 2, 7, 12, 14, 19, 22, 25, 35). The LDT data packets are concentrated based on a delay T, which defines the number of DTU periods by which a LDT data packet can be delayed before being transmitted over the communication medium. In the example T is set to 2 DTU periods. Rather than being transmitted in DTU 0, LDT data packet 2 is delayed for T=2 DTU periods and is encapsulated together with LDT packet 7 in DTU 2. The rest of DTU 2 is filled up with higher QoS tolerant data packets 10 and 11. Similarly, LDT data packets 12 and 14 are delayed for T=2 DTU periods and combined with LDT data packets 19 and 22 in DTU 5, and LDT data packets 25 and 35 are combined in DTU 8. As a result of this concentration, only 3 out of 9 DTUs (=1 out of T DTUs) contain LDT data packets. In case there are sufficient LDT data packets to fill a complete DTU, then there is no need to wait for the entire delay T. Instead the LDT data packets can be transmitted in the next DTU. This is illustrated in FIG. XB, where now LDT data packets 12, 13, 18, and 19 are encapsulated in DTU 4, i.e. there is only 1 DTU delay for data packets 12 and 13. With this approach, the number of DTUs that contain LDT data packets can scale well with the relative volume of LDT traffic.

FIG. 2 illustrates a transmitter 230 according to an example embodiment. Transmitter 230 may be part of a larger communication system 200 further comprising a transmit Inter-Working Function, IWF, circuitry 210 that provides data packets to the transmitter 230, a communication line 201, a receiver 250 and a receiving IWF circuitry 270. Transmitter 230 may be contained in an access node having a plurality of such transmitters 230 for the transmission of DTUs over respective communication lines. The receiver 250 may then be contained in an upstream receiving node, termination node or Customer Premises Equipment, CPE. Similarly, transmitter 230 may also be contained in such an upstream receiving node, termination node or CPE for the upstream transmission of the DTUs to respective receivers 250 located in the access node. Communication system 200 may for example be part of a G.mgfast communication system.

Transmission IWF circuitry 200 comprises a Packet Processing unit, PP, 211 which classifies data packets according to origin, destination, required changes and QoS class. Packets are then forwarded to Traffic Manager, TM, 212 that forwards the data packets to buffers or queues 213 according to one or more link-layer QoS classes assigned to the data packets. Scheduler 214 then retrieves the packets from the queues 213 according to a scheduling algorithm, for example a weighted fair scheduling, WFQ, algorithm. The packets are then labelled or tagged according to a QoS path or channel that is used in the transmitter 230, for example from eight QoS classes to four QoS tolerances. The packets are then exchanged between the IWF circuitry 210 operating at the link layer and the transmitter 230 operating at the physical layer by respective interfacing circuitries 216 and 231.

Transmitter 230 comprises buffers or queues 233 for buffering the received data packets according (232) to the tagged QoS tolerances and a DTU encapsulator 236 for encapsulating the packets retrieved from the buffers 233. To perform the concentration of data packets with lower QoS tolerance, transmitter 230 also comprises a concentrating circuitry 234 configured to delay packets with the lower QoS tolerance in their buffer such that they are only encapsulated in the subset of available DTUs. Both the amount of delay and the size of the subset may be configurable.

In the embodiment of FIG. 2, the delaying is performed by the concentrating circuitry after the buffers 233. Alternatively, the delaying of the data packets may be performed by other means along the transmission path. For example, the delaying may also be performed at the DTU level after or in the DTU encapsulator 236. In such a case, the data packets with the lower QoS tolerance are directly encapsulated in a dedicated assembly DTU upon arrival of the data packets, but the transmission of this DTU is delayed until the next transmission opportunity or until the assembly DTU is completely full. In the meanwhile, data packets with a higher QoS tolerance are added to a separate assembly DTU and not further delayed.

Transmitter 230 further comprises a retransmission buffers 239 for buffering transmitted DTU according to the QoS tolerance of the transmitted DTU, i.e., according to the lowest QoS tolerance of all the packets in the DTU. To this respect, DTUs of the subset will have a lower QoS tolerance than the other DTUs. Not all types of DTUs may to be retransmitted. For example, HDT and HLT DTUs may be skipped for retransmission. A further scheduler 237 then selects either a new DTU from the encapsulator 236 or an already transmitted DTU from the retransmission buffers 239. Scheduler 237 may then prioritize the retransmission of DTUs with a lower QoS tolerance over the retransmission of DTUs with a higher QoS tolerance. Furthermore, scheduler 237 may provide a higher number of retransmissions for DTUs with a lower QoS tolerance than for DTUs with a higher QoS tolerance. Transmitter 230 then transmits the DTU over the communication medium 201 by further transmission logic (not shown in Figure).

At the receiver side, an opposite procedure is followed. In receiver 250, the received DTUs are decapsulated by decapsulator 251 into the data packets and the packets are stored in buffers 253 by demultiplexing circuitry 252 according the QoS tolerances of the data packets. The packets are then retrieved by scheduler 254 from the buffers and forwarded to the IWF receiving circuity 270 over the interfacing circuitry 255 and 271. These packets are then stored in IWF queues 274 according to the link layer QoS classes and retrieved by scheduler 275 according to a scheduling algorithm.

By the delaying 234 of the data packets with a lower QoS tolerance and, thereby, concentrating them in a subset of the DTUs, the number of DTUs that carry data packets of this particular QoS class is reduced, i.e. the ratio R of DTUs carrying traffic of such QoS class relative to the total load of DTUs is reduced. This differentiation in the content and thus the QoS tolerance of the DTUs allows differentiating the related QoS aspects and treatment of the transmission of these DTUs on the communication medium 201. The fewer DTUs with data packets with a particular QoS tolerance have to be transmitted, the more opportunities are available for improving the QoS experience of this type of DTUs. If DTUs cannot be distinguished from each other with respect to their QoS tolerance, then there is no possibility for a differentiated treatment of DTUs on the medium that satisfies the QoS requirements of the data packets contained in the respective DTUs.

The theoretical lower bound for the average ratio R=LQ/L is achieved when the subset of the DTUs is always filled completely and exclusively with data packets of the concerned QoS tolerance; and wherein LQ corresponds to the traffic load of the data packets with the considered QoS class and L is the total traffic load. This theoretical lower bound may be achieved when: i) the traffic load LQ of data packets with the considered QoS tolerance is sufficiently high; ii) in case lower traffic load conditions apply, then the delay tolerance of data packets for the concerned QoS tolerance should be sufficiently high. In practice, neither of these conditions may occur or even be closely achieved. Worst case, already for relatively small LQ/L ratios, the ratio R may be around 1 if no further measure would be undertaken. By the concentration mechanism as implemented in concentrator 234, the average ratio M/N may be maintained in a range $[(L_Q/L):(1-\varepsilon)]$, wherein $\varepsilon$ represents a concentration gain achievable for a given maximum delay tolerance of the considered data packets minus the required number of pro- or re-active retransmission opportunities foreseen by the scheduler 237 for the considered QoS tolerance.

Concentration is more preferred for data packets with a lower QoS tolerance, e.g. LDT data packets and/or LLT data packets. This allows a differentiated and more premium QoS treatment of DTUs of the subset, i.e. of the DTUs that are filled partly or completely with data packets with the lower QoS tolerance. This more premium treatment comes at the expense of the QoS experience for DTUs filled exclusively with data packets with a higher QoS tolerance. In particular, for disturbance-prone communication media, restricting the ratio of e.g. a subset of the DTUs with lower QoS tolerant data packets relative to all DTUs, creates dedicated opportunities for expedited or prioritized LDT DTU (re-)transmission, or dedicated LLT DTU re-transmission frequency strategies during or after a disturbance on the communication medium 201.

According to an example embodiment, transmitter 230 operates according to the following mechanism:
1) Separate data packets according to the QoS class which needs a different treatment on the communication medium under consideration. For example, the separation may be performed by demultiplexer 232 based on the same or broader QoS classification performed by the preceding IWF circuitry 210
2) Buffer and delay the data packets for this particular QoS class in buffers 233, which may depend on a combination. The amount of delay allowed by the concentrator 234 and/or the size of the selected subset of DTUs may be selected based on different parameters, i.e. based on at least one of:
   a) The maximum delay tolerance of the data packets and thus the DTUs: this determines how long data packets can be buffered in either buffer 233 or 239 and, thus, how many pro- or re-active re-transmission opportunities by scheduler 237 may be performed, i.e. when the latest transmission opportunity must be scheduled.
   b) The maximum loss tolerance of the data packets and thus the DTUs: this determines how many pro- or re-active re-transmission opportunities must be scheduled at minimum for a given disturbance distribution on the medium.
   c) A specific encoding need: this determines what extra encoding must be applied to the DTUs of the subset.
   d) Other parameters such as scheduling information; a traffic load of the first data packets; a total traffic load; an arrival pattern of the first data packets; QoS requirements associated with the lower QoS tolerance; information regarding the communication medium; and information regarding disturbances over the communication medium.
3) Concentrator 234 inserts the delayed data packets for the considered QoS tolerance in a next to be transmitted DTU of the subset. Concentrator 234 performs this on average N/M times the DTU period after the previous DTU of the subset.

Regarding the values of M and: M and/or N may be constant or nearly-constant, i.e. M varies slowly over time relative to the time-scale while the disturbance distribution is at least nearly-constant. In this case, the parameters M and N may be determined based on the traffic load Lo, the transmission interval of available DTUs, and disturbance distribution. Alternatively, M and/or M vary quickly, i.e. within the actual order of N and M. In this case the delay and subset may be determined based on i) the instantaneous load of the data packets of the concerned QoS class; ii) the scheduling opportunities for transmission of DTUs, i.e. the transmission of DTUs may not be a continuous process in time, but a discrete process determined by media sharing and power constraints; and/or iii) the distribution of disturbances, i.e. occurrence, duration and intensity of disturbances on the communication medium. The distribution may be pre-defined or determined in real-time by a monitoring of the communication medium.

More particular, according to a further example embodiment, the scheduling rules for data packets arriving from the IWF circuitry 210 are as follows:

1. If data packets with both lower and higher QoS tolerance are available at the same time in buffers 233 then:
   a) Buffer the lower QoS tolerant data packets until the latest DTU scheduling opportunity before the maximum allowed delay expires. As established before, this delay may be determined as the maximum delay tolerance minus the required number of pro-active or re-active retransmission opportunities multiplied by their duration. This results in i) an average ratio of M/N DTUs carrying the lower QoS tolerant data packets and in ii) an additionally Packet Delay Variation (PDV) of on average N/(2*M) DTUs for the lower QoS tolerant data packets.
   b) When the DTU is not yet full at the next DTU scheduling opportunity, then fill up the DTU with data packets with higher QoS tolerance that are available in the other buffers 239.
   c) In case the buffer with the lower QoS tolerant data packets contains enough data packets to completely fill a DTU, then do not wait for the latest scheduling opportunity, but immediately encapsulate the DTU and schedule it for transmission. By this mechanism, overload situations wherein the lower QoS tolerance traffic load Lo exceeds a fraction of on average M/N of the total data rate, are also anticipated for.
2. If only data packets with the lower QoS tolerance are available in buffers 233 then:
   a) Buffer the data packets until the latest DTU scheduling opportunity as determined under above step 1 a, i.e., still concentrate the data packet thereby reducing the number of potentially retransmitted DTUs in case of a disturbance event.
   b) When the DTU is not yet completed at the latest DTU scheduling opportunity, then pad the DTU and schedule it for direct transmission.
   c) In case the buffer with the lower QoS tolerant data packets contains enough data packets to completely fill a DTU, then do not wait for the latest scheduling opportunity, but directly encapsulate the DTU and schedule it for transmission, similar as described under above step 1c.
3. If only data packets with the higher QoS tolerance are available in buffers 233 then:
   a) Buffer these data packets with the higher QoS tolerance until the latest DTU scheduling opportunity as determined under above step 1 a, i.e., still concentrate the data packets thereby also reducing the number of potentially retransmitted DTUs in case of a disturbance event.
   b) Complete the DTU with the higher QoS tolerant packets with padding, if not yet full at the scheduled transmission opportunity. Do not complete the DTU with lower QoS tolerant data packets that may have arrived since the start of the DTU construction, unless the maximum delay tolerance of these newly arrived data packets cannot be met by waiting for a next DTU transmission scheduling opportunity for those packets.
   c) In case the buffer with the lower QoS tolerant data packets contains enough data packets to completely fill a DTU, then do not wait for the latest scheduling opportunity, but directly encapsulate the DTU and schedule it for transmission, similar as described under above step 1c.

According to an example embodiment, the following QoS tolerances may be defined, i.e., a buffer 233 for each of these tolerances may be constructed:
1) HLT data packets: these do not require much protection, i.e. few or no re-transmission opportunities.
2) LLT&LDT data packets: these require a limited amount of expedited re-active re-transmission opportunities, wherein the sum of the maximum concentration interval and the latest re-active retransmission opportunity must be smaller than the maximum delay tolerance.
3) LLT & very LDT data packets: these require pro-active retransmission opportunities, wherein the sum of the maximum concentration interval and the latest pro-active re-transmission opportunity must be smaller than the maximum delay tolerance.
4) Very LLT & HDT data packets: these require more re-active re-transmission opportunities than average wherein the sum of the maximum concentration interval and the latest re-active re-transmission opportunity is smaller than the maximum delay tolerance.

The above described scheduling mechanism may for example be applied to any media using grouping of data packets in larger blocks, containers, DTUs, and re-transmission of these blocks for mitigating burst data transfer disturbances; to any type of QoS characteristic, e.g. delay tolerance, loss tolerance, corruption tolerance and snooping tolerance. For example, in case of LLT data, the differentiation between DTUs through concentration of LLT data packets allows differentiating in dedicated data protection measures: addition of FEC, use of data block interleaving or differentiate in the number of re-transmission opportunities.

The scheduling of DTU transmission during or after a line disturbance event may further be performed according the specific requirements of the application. For example, in case of a G.mgfast communication system, either re-transmitted DTUs with lower QoS tolerance have priority over re-transmitted DTUs higher QoS tolerance; or new and re-transmitted DTUs with lower QoS tolerance have priority over re-transmitted DTUs higher QoS tolerance.

For example, if LDT or LLT data packets may occur only in on average half of the transmitted DTUs, i.e. DTU encapsulation skips LDT or LLT data packets every other DTU, then the LDT or LLT data packets will experience on average 1/2 DTU duration extra delay during normal operation. However, after a disturbance, all LDT data packets are re-transmitted in 1/2 of the time needed to re-transmit all affected data. Because of the priority they have over HLT DTUs, or LLT data packets require only 1/2 the amount of extra FEC bits or extra DTU retransmission opportunities for sufficient protection.

According to an example embodiment, a G.mgfast system has to store DTUs for possible re-transmission during at least one Round Trip Time, RTT, of the DTU in one direction and the associated Acknowledge, ACK, message in the reverse direction. When the DTU re-transmission queue(s) 239 get(s) full due to ongoing disturbance on the DSL line, the transmitter 230 function will send a back-pressure to the IWF circuitry 210, which will stop scheduling packets from its TM 212 QoS queues 213, and, hence, temporarily store all packets to be transmitted in these queues 213, until the disturbance is gone, and back-pressure is lifted. The RTT of a G.mgfast system is currently estimated as of the order of 500 microseconds.

FIG. 3 shows a time representation of the transportation of LDT data packets 303 and HDT data packets 302 over a communication system comprising a transmitter 330, a communication medium 301 and a receiver 350. The time representation illustrates a normal condition, i.e. during which no disturbances occur. Arriving data packets 302, 303 are encapsulated 336 in DTUs 304, 305 and transmitted over communication medium 301. At the same time, the DTUs 304, 305 are kept in a re-transmission queue 339 with an indication of the maximum delay tolerance of the data packets encapsulated in each of the DTUs.

FIG. 4 illustrates how the traffic pattern of FIG. 3 changes in case of a exemplary full disturbance 420 on the communication line 301 during a certain time duration TD. Furthermore, in the communication system of FIGS. 3 and 4 there is no mechanism for QoS differentiation between DTUs as, i.e., they illustrate a situation where the scheduling according to the foregoing embodiments is not applied. This differentiation may be absent because the DTUs have not been marked with such a QoS parameter, or because nearly every DTU contains part of at least one data packet with a lower QoS tolerance. All data packets already transferred from an IWF circuitry to the transmitter 330 at the time the disturbance 420 will exhibit the time same delay TD as caused by the disturbance. Only data packets held back in the IWF circuitry during the disturbance will benefit from expedited transfer by virtue of the QoS aware packet scheduling in the IWF circuitry.

FIG. 5. illustrates how the traffic pattern of FIG. 3 changes in case of a same full disturbance 420 on the line during the time duration TD, but when the QoS differentiation according to the foregoing embodiments is applied, e.g. when the communication system of FIG. 5 corresponds to the communication system 200 having a transmitter 530 connecting to receiver 550 over the communication medium 501. In the example of FIG. 5, the ratio R=M/N=1/2. In this case, all LDT data packets 503, including the ones already transferred from the IWF circuitry to the transmitter 530 at the time the disturbance 501 started, encapsulated in DTUs 505 and present in the LDT DTU re-transmission queue 539, only suffer an additional delay that is smaller than TD. The first data packets 503 will overtake most of the HDT data packets 502 that preceded the LDT data packets them when the disturbance started. Some HDT data packets may still be encapsulated in the LDT marked DTUs 505, but most will be kept because of holes in the packet sequence at the receiver 550. The last LDT data packet will overtake all preceding HDT data packets and arrive after a delay roughly equal to TD/2. In case the disturbance time TD lasts longer than the RTT, this effect will be limited to (TD-RTT/2), because the mechanism is most effective for data packets stored in DTUs 504,505 to be re-transmitted. Yet, new DTUs will be filled with only LDT data packets from the IWF circuitry due to the priority scheduling of the latter, and also these will benefit from expedited transmission if new DTUs with LDT marking can take precedence over a volume of to be re-transmitted DTUs with only HDT marking.

The foregoing described mechanism for QoS differentiation also benefits for the use-case wherein pro-active retransmissions of the DTUs are performed to protect the lower QoS tolerant data packets, e.g. Very LDT & LLT packets, but not or less the higher QoS tolerant packets, e.g., the HDT & (LLT or HLT) packets. For this use-case, any DTU containing VLDT packets is to be pro-actively re-transmitted (more often). Any HDT packets that are contained in a DTU containing at least one VLDT packet will be needlessly retransmitted, leading to additional overhead. By concentrating the VLDT packets in on average M/N DTUs, it is ensured that this overhead remains limited.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A transmitter comprising data encapsulation circuitry configured to:
   encapsulate data packets into Data Transport Units (DTUs), for transmission over a communication medium; the data packets having respective quality of service (QoS) tolerances; and
   delay transmission of first data packets with a lower QoS tolerance and group the first data packets in a subset of DTUs available for transportation of the first data packets.

2. The transmitter according to claim 1, wherein the subset comprises on average M DTUs used for transportation of the first data packets out of N DTUs available for transportation of the first data packets, M and N being two non-null positive integers with M lower than N.

3. The transmitter according to claim 1, wherein the QoS tolerances relate to at least one of a delay tolerance or a loss tolerance.

4. The transmitter according to claim 1, wherein at least one of the subset or the delaying is determined or adjusted based on at least one of:
   scheduling information;
   a traffic load of the first data packets;
   a total traffic load;
   an arrival pattern of the first data packets;
   QoS requirements associated with the lower QoS tolerance;
   information regarding the communication medium; or
   information regarding disturbances over the communication medium.

5. The transmitter according to claim 1, wherein the data encapsulation circuitry further comprises a retransmission buffer configured to buffer transmitted DTUs; and wherein the data encapsulation circuitry is further configured to prioritize retransmission of the DTUs of the subset.

6. The transmitter according to claim 1, wherein the data encapsulation circuitry further comprises a retransmission buffer configured to buffer transmitted DTUs; and wherein the data encapsulation circuitry is further configured to configure a higher number of re-transmission opportunities for the DTUs of the subset.

7. The transmitter according to claim 1, wherein the data encapsulation circuitry is further configured to multiplex second data packets with a higher QoS tolerance in the subset of DTUs.

8. The transmitter according to claim 1, wherein the data encapsulation circuitry is further configured to, when enough of the first data packets are available to fill a complete DTU, transmit the complete DTU with the first data packets without further delaying.

9. The transmitter according to claim 1, wherein the communication medium is a wired point-to-point or point-to-multipoint communication medium.

10. The transmitter according to claim 9, wherein the transmission is a DSL-based transmission and the data packets are DTU frames.

11. The transmitter according to claim 1, wherein the communication medium is a wireless point-to-point or point-to-multipoint communication medium.

12. A subscriber device comprising the transmitter according to claim 1.

13. An access node comprising at least one of the transmitter according to claim 1.

14. A method comprising:
   encapsulating data packets into Data Transport Units (DTUs) for further transmission over a communication medium, the data packets having respective Quality of Service (QoS) tolerances;
   delaying the transmission over the communication medium of first data packets with a lower QoS tolerance; and
   grouping the first data packets in a subset of DTUs available for transportation of the first data packets.

* * * * *